(12) United States Patent
Kawamura et al.

(10) Patent No.: US 8,497,319 B2
(45) Date of Patent: Jul. 30, 2013

(54) DISPERSION AND AQUEOUS COATING COMPOSITION COMPRISING THE DISPERSION

(75) Inventors: Chikara Kawamura, Hiratsuka (JP); Kisheong Han, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 13/534,191

(22) Filed: Jun. 27, 2012

(65) Prior Publication Data

US 2012/0264874 A1    Oct. 18, 2012

Related U.S. Application Data

(62) Division of application No. 12/688,420, filed on Jan. 15, 2010, now abandoned.

(30) Foreign Application Priority Data

Jan. 19, 2009  (JP) ................. 2009-008620
Jul. 17, 2009  (JP) ................. 2009-168413

(51) Int. Cl.
*C08L 1/02*  (2006.01)
*C08L 1/08*  (2006.01)

(52) U.S. Cl.
USPC ........ 525/54.21; 525/54.3; 527/313; 527/314

(58) Field of Classification Search
USPC ............ 525/54.21, 54.3; 527/314, 313
See application file for complete search history.

(56) References Cited

U.S. PATENT DOCUMENTS

| 3,883,453 | A |   | 5/1975  | Takahashi et al. |
|-----------|---|---|---------|------------------|
| 4,136,068 | A |   | 1/1979  | Nomura et al.    |
| 4,417,025 | A | * | 11/1983 | Toba et al. ............. 525/54.21 |
| 4,435,531 | A | * | 3/1984  | Nakayama et al. ......... 524/37 |
| 4,970,247 | A |   | 11/1990 | Hoppe et al.     |

FOREIGN PATENT DOCUMENTS

| EP | 0138703    | 4/1985  |
| EP | 0339415    | 11/1989 |
| JP | A-53-21225 | 2/1978  |
| JP | A-56163159 | 12/1981 |
| JP | A-60-123501| 7/1985  |

* cited by examiner

*Primary Examiner* — Satya Sastri
(74) *Attorney, Agent, or Firm* — Millen, White, Zelano & Branigan, P.C.

(57) ABSTRACT

The present invention relates to a dispersion comprising an acryl-modified cellulose ester derivative (D) dispersed in an aqueous medium, wherein a hydrophobic acrylic resin (B) and a hydrophilic acrylic resin (C) are grafted onto a cellulose ester derivative (A) in the acryl-modified cellulose ester derivative (D). The dispersion has excellent long-term storage stability, and aqueous coating compositions comprising the dispersion can form coating films with excellent coating workability, solvent resistance, chemical resistance, water resistance, and excellent curability.

6 Claims, No Drawings

DISPERSION AND AQUEOUS COATING COMPOSITION COMPRISING THE DISPERSION

This application is a divisional of U.S. patent application Ser. No. 12/688,420, filed on Jan. 15, 2010 now abandoned.

BACKGROUND OF THE INVENTION

1. Field of the Invention

The present invention relates to a dispersion with excellent storage stability that employs a cellulose derivative as a plant-derived starting material, and specifically it relates to an aqueous coating composition with excellent curability obtained using the dispersion, that can form coating films with excellent coating workability, solvent resistance, chemical resistance and water resistance.

2. Description of the Related Art

Cellulose derivatives such as cellulose acetate butyrate are widely used as rheology controlling agents in the field of coating compositions.

Acrylic resins are also grafted onto cellulose derivatives, as disclosed in Japanese Unexamined Patent Publication SHO No. 56-163159, for use not only as rheology controlling agents but also for use of the cellulose derivatives as base resins, because of their excellent coating film performance including water resistance and solvent resistance, and their excellent sag resistance during coating and their superior coating appearance.

On the other hand, development of environmentally-friendly products continues to advance in the coating composition industry, as environmental pollution increases and society shifts toward greater recycling with the aim of reducing the burden on the environment. In light of these circumstances, and from the viewpoint of minimizing global warming and preventing deterioration of the indoor environment by reducing carbon dioxide gas emission, it has been a goal to develop coating compositions which, while naturally containing low amounts of volatile organic compounds (VOC) such as toluene and xylene, also employ plant-derived starting materials and biodegradable materials as carbon neutral starting materials from the viewpoint of reducing soil contamination after disposal.

Cellulose derivatives are useful starting materials in this sense, but their use in aqueous systems is problematic, particularly from the standpoint of storage stability. Emulsifiers are generally used for dispersing the cellulose derivatives in water, but the use of emulsifiers leads to problems such as reduced coating film performance, including durability and water resistance. Methods that do not use emulsifiers have also been developed.

Japanese Unexamined Patent Publication SHO No. 53-21225 discloses a water-dispersible cellulose graft polymer obtained by grafting an ethylenic unsaturated carboxylic acid-containing vinyl monomer onto the maleic anhydride reaction product of a cellulose ester derivative.

Japanese Unexamined Patent Publication SHO No. 60-123501 also discloses a carboxylated cellulose ester having an acid value of 5 or greater and an inherent viscosity of 0.01-1.00.

However, these resins have high viscosity in water and can only produce low solid content coating compositions, while their storage stability is also inadequate.

BRIEF SUMMARY OF THE INVENTION

It is an object of the present invention to provide a dispersion of an acryl-modified cellulose ester derivative which does not produce deposition of dispersoid particles or increased dispersion viscosity even during prolonged storage, and an aqueous coating composition comprising the dispersion, which exhibits excellent coating film performance including water resistance and solvent resistance and forms coating films with excellent sag resistance and coating appearance, as well as coated articles with excellent hardness and weather resistance that are obtained by applying the aqueous coating composition.

As a result of much diligent research with the aim of solving the problems alluded to above, the present inventors have found that the problems can be solved by an acryl-modified cellulose ester derivative dispersion which is obtained by separately grafting a hydrophobic acrylic resin and a hydrophilic acrylic resin onto a cellulose ester derivative, and the invention has been completed upon this finding.

The present invention relates to a dispersion wherein an acryl-modified cellulose ester derivative (D) comprising a hydrophobic acrylic resin (B) and a hydrophilic acrylic resin (C) grafted onto a cellulose ester derivative (A), is dispersed in an aqueous medium.

The invention further relates to an aqueous coating composition comprising the dispersion, and to coated articles obtained by application of the aqueous coating composition.

The dispersion of the acryl-modified cellulose ester derivative (D) according to the invention is obtained by separately grafting a hydrophobic acrylic resin (B) and a hydrophilic acrylic resin (C) onto a cellulose ester derivative (A) to produce the acryl-modified cellulose ester derivative (D), and dispersing the acryl-modified cellulose ester derivative (D) in an aqueous medium.

Since the acryl-modified cellulose ester derivative (D) of the invention has the hydrophobic side-chain and hydrophilic side chain formed separately, the core sections and shell sections of the particles which are produced by dispersing the acryl-modified cellulose ester derivative (D) in the water are distinct, such that firm particles may be expected to be formed and long-term storage stability can be ensured to a degree far beyond that obtained when a hydrophilic side chain is simply introduced into a cellulose ester derivative.

Cellulose derivatives such as cellulose acetate butyrate are widely used as rheology controlling agents in organic solvent-based coating compositions, and it was confirmed that the dispersion of the invention has a similar rheology controlling effect. Furthermore, while the acryl-modified cellulose ester derivative (D) is known to exhibit excellent coating film performance including water resistance and solvent resistance, it was confirmed that the dispersion of the invention also exhibits similar excellent coating film performance, and the acryl-modified cellulose ester derivative (D) dispersion of the invention is therefore highly useful for application not only as a coating composition but also in a wide range of fields such as inks and adhesives.

DETAILED DESCRIPTION OF THE INVENTION

The dispersion of the invention is a dispersion comprising an acryl-modified cellulose ester derivative (D) dispersed in an aqueous medium, wherein a hydrophobic acrylic resin (B) and a hydrophilic acrylic resin (C) are grafted onto a cellulose ester derivative (A) in the acryl-modified cellulose ester derivative (D).

Cellulose Ester Derivative (A)

The cellulose ester derivative (A) used for the invention is obtained by esterification of cellulose with an acid leaving a portion of the hydroxyl groups, and examples thereof include cellulose esters such as cellulose acetate, cellulose acetate propionate, cellulose acetate butyrate, cellulose propionate, cellulose butyrate, cellulose acetate phthalate and cellulose nitrate, although cellulose acetate propionate and cellulose acetate butyrate are preferred, and cellulose acetate butyrate is especially preferred, from the viewpoint of easier production and storage stability of the dispersion.

The cellulose ester derivative (A) used may be a commercial product, with examples of cellulose acetate including CA-394-60S, CA-398-6 and CA-398-30 (all trade names of Eastman Chemical Company), examples of cellulose acetate propionate including CAP-482-0.5 and CAP-504-0.2 (both trade names of Eastman Chemical Company), and examples of cellulose acetate butyrate including CAB-551-0.01, CAB-551-0.2, CAB-553-0.4, CAB-531-1, CAB-500-5, CAB-381-0.1, CAB-381-0.5, CAB-321-0.1 and Solus2100 (all trade names of Eastman Chemical Company). Products with low molecular weight and relatively low viscosity are preferred among these because of their excellent solubility in reaction solvents during acrylic modification. Specifically, products with number-average molecular weights of up to 50,000 and especially in the range of 1000-50,000 are suitable, and as examples of commercial products with such number-average molecular weights there may be mentioned CAB-551-0.01, CAB-321-0.1 and Solus2100.

The number-average molecular weight referred to throughout the present specification is the value of the number-average molecular weight measured by gel permeation chromatography, with the number-average molecular weight of polystyrene as reference.

Acryl-Modified Cellulose Ester Derivative (D)

As examples of methods for grafting the hydrophobic acrylic resin (B) and hydrophilic acrylic resin (C) onto the cellulose ester derivative (A) there may be mentioned:

(1) a method of separately graft polymerizing a radical-polymerizable unsaturated monomer mixture (b) used to synthesize the hydrophobic acrylic resin (B) and a radical-polymerizable unsaturated monomer mixture (c) used to synthesize the hydrophilic acrylic resin (C) in the presence of the cellulose ester derivative (A), and (2) a method of reacting the hydrophobic acrylic resin (B) having a group that reacts with hydroxyl group and the hydrophilic acrylic resin (C) having a group that reacts with hydroxyl group, with the hydroxyls of the cellulose ester derivative (A), and so on, but method, (2) limits the resin composition since hydroxyl group-containing acrylic resins cannot be used, while method (1) is preferred from the viewpoint of production convenience and production cost. Method (1) will now be explained.

In method (1), a radical-polymerizable unsaturated monomer mixture (b) used to synthesize the hydrophobic acrylic resin (B) and a radical-polymerizable unsaturated monomer mixture (c) used to synthesize the hydrophilic acrylic resin (C) are separately graft polymerized onto the cellulose ester derivative (A).

The hydrophobicity and hydrophilicity of the acrylic resins are based on the composition of the radical-polymerizable unsaturated monomer mixtures used for synthesis of the resins, and they are usually adjusted by the content of radical-polymerizable unsaturated monomers with hydrophilic groups including anionic groups such as carboxyl and sulfonic acid, cationic groups such as amino groups and non-ionic groups such as polyoxyalkylene groups (especially polyoxyethylene groups). From the standpoint of ease of production and storage stability of the dispersion, they are preferably adjusted by the carboxyl group-containing radical-polymerizable unsaturated monomer content.

For adjusting the hydrophobicity and hydrophilicity of the acrylic resins by the carboxyl group-containing radical-polymerizable unsaturated monomer content, the amount of carboxyl group-containing radical-polymerizable unsaturated monomers in the radical-polymerizable unsaturated monomer mixture (b) used for synthesis of the hydrophobic acrylic resin (B) is preferably less than 5 mass % and especially less than 4 mass % from the viewpoint of storage stability of the dispersion of the acryl-modified cellulose ester derivative (D), while the amount of hydroxyl-containing radical-polymerizable unsaturated monomers is preferably in the range of 5-95 mass % and especially 10-70 mass % from the viewpoint of curability and weather resistance of the obtained coating film. The amount of carboxyl group-containing radical-polymerizable unsaturated monomers in the radical-polymerizable unsaturated monomer mixture (c) used for synthesis of the hydrophilic acrylic resin (C) is preferably in the range of 5-95 mass % and especially 7-70 mass % from the viewpoint of storage stability of the dispersion, while the amount of hydroxyl-containing radical-polymerizable unsaturated monomers is preferably in the range of 5-95 mass % and especially 10-70 mass % from the viewpoint of curability and weather resistance of the obtained coating film.

For reliable grafting, at least one radical-polymerizable unsaturated group may be introduced into the cellulose ester derivative (A) before synthesis of the acrylic resins.

In order to introduce the at least one radical-polymerizable unsaturated group into the cellulose ester derivative (A), publicly known methods may be used. As examples there may be mentioned a method in which an organic carboxylic anhydride with a radical-polymerizable unsaturated group (for example, acrylic anhydride, methacrylic anhydride, maleic anhydride, itaconic anhydride, citraconic anhydride, tetrahydrophthalic anhydride or octenylsuccinic anhydride) is added to the cellulose ester derivative (A), a method in which an organic carboxylic anhydride such as phthalic anhydride is added to the cellulose ester derivative (A) to introduce an acid group and then glycidyl(meth)acrylate is added, or a method in which a monomer having a radical-polymerizable unsaturated group and an isocyanate group is added to the cellulose ester derivative (A).

From the viewpoint of production stability during production of the acryl-modified cellulose ester derivative (D), the method of adding a monomer with a radical-polymerizable unsaturated group and an isocyanate group to the cellulose ester derivative (A) is preferred. As examples of monomers with a radical-polymerizable unsaturated group and an isocyanate group there may be mentioned 2-isocyanatoethyl (meth)acrylate. An equimolar urethanated reaction product of a diisocyanate compound and hydroxyalkyl(meth)acrylate may also be used.

Examples of diisocyanate compounds include tolylene diisocyanate, metaphenylene diisocyanate, diphenylmethane diisocyanate, isophorone diisocyanate, hexamethylene diisocyanate, xylylene diisocyanate, hydrogenated diphenylmethane diisocyanate and α,α,α',α'-tetramethylxylylene diisocyanate.

The content of the at least one radical-polymerizable unsaturated group in the cellulose ester derivative (A) is preferably in the range of 0.0001-0.100 mmol/g and especially 0.0005-0.050 mmol/g. If the radical-polymerizable unsaturated group content is less than 0.0001 mmol/g there will be virtually no effect of improved long-term storage stability for the dispersion; however, if it exceeds 0.100 mmol/g, increased viscosity and gelling will tend to occur more readily during polymerization of the radical-polymerizable unsaturated monomer mixtures in the presence of the radical-polymerizable unsaturated group-containing cellulose ester derivative (A), thus requiring greater care for polymerization. For production of the acryl-modified cellulose ester derivative (D), introduction of the at least one radical-polymerizable unsaturated group into the cellulose ester derivative (A) adds one step to the synthesis and increases cost, and therefore selection must be made according to the purpose of use.

The following fatty acid-modified acrylic monomers may be mentioned as examples of radical-polymerizable unsaturated monomers to be used for radical polymerization reaction in the presence of the cellulose ester derivative (A), which have at least one radical-polymerizable unsaturated group introduced therein.

Carboxyl group-containing polymerizable unsaturated monomers such as acrylic acid, methacrylic acid, crotonic acid, itaconic acid, maleic acid, fumaric acid, 2-carboxyethyl (meth)acrylate, 2-carboxypropyl(meth)acrylate and 5-carboxypentyl(meth)acrylate;

Hydroxyl group-containing radical-polymerizable unsaturated monomers including C2-C8 hydroxyalkyl esters of acrylic acid or methacrylic acid, such as 2-hydroxyethyl (meth)acrylate, 3-hydroxypropyl(meth)acrylate and 4-hydroxybutyl(meth)acrylate, or (poly)ethyleneglycol mono (meth)acrylate, polypropyleneglycol mono(meth)acrylate or polybutyleneglycol mono(meth)acrylate;

Reaction products of these hydroxyl group-containing radical-polymerizable unsaturated monomers with lactone compounds such as β-propiolactone, dimethylpropiolactone, butyrolactone, γ-valerolactone, γ-caprolactone, γ-caprylolactone, γ-laurylolactone, ε-caprolactone or ε-caprolactone;

PLACCEL FM-1, PLACCEL FM-2, PLACCEL FM-3, PLACCEL FA-1, PLACCEL FA-2 and PLACCEL FA-3 (all caprolactone-modified (meth)acrylic acid hydroxy esters that are trade names of Dicel Chemical Industries, Ltd.);

C1-C18 alkyl or cycloalkyl esters of (meth)acrylic acid such as methyl(meth)acrylate, ethyl(meth)acrylate, propyl(meth)acrylate, butyl(meth)acrylate, hexyl(meth)acrylate, 2-ethylhexyl(meth)acrylate, octyl(meth)acrylate, lauryl (meth)acrylate, cyclohexyl(meth)acrylate and isobornyl (meth)acrylate;

Vinyl aromatic compounds such as styrene, α-methylstyrene, vinyltoluene, p-chlorstyrene and vinylpyridine;

Epoxy group-containing polymerizable unsaturated monomers, such as glycidyl(meth)acrylate and 3,4-epoxycyclohexylmethyl(meth)acrylate;

Nitrogen-containing radical-polymerizable unsaturated monomers such as N-(2-hydroxyethyl)(meth)acrylamide, N-(2-hydroxypropyl)(meth)acrylamide, N-(3-hydroxypropyl)(meth)acrylamide, N-methyl-N-(2-hydroxyethyl)(meth) acrylamide, N-ethyl-N-(2-hydroxyethyl)(meth)acrylamide, N-methyl-N-(2-hydroxypropyl)(meth)acrylamide, N-methyl-N-(3-hydroxypropyl)(meth)acrylamide, N-ethyl-N-(2-hydroxypropyl)(meth)acrylamide, N-ethyl-N-(3-hydroxypropyl)(meth)acrylamide, N,N-di-(2-hydroxyethyl)(meth) acrylamide and N,N-di-(2-hydroxypropyl)(meth) acrylamide;

Alkoxysilyl group-containing radical-polymerizable unsaturated monomers such as vinyltrimethoxysilane, vinylmethyldimethoxysilane, vinyldimethylmethoxysilane, vinyltriethoxysilane, vinylmethyldiethoxysilane, vinyldimethylethoxysilane, vinyltripropoxysilane, vinylmethyldipropoxysilane, vinyldimethylpropoxysilane, γ-(meth)acryloyloxypropyltrimethoxysilane, γ-(meth)acryloyloxypropylmethyldimethoxysilane and γ-(meth)acryloyloxypropyldimethylmethoxysilane;

and monomers having two or more radical-polymerizable unsaturated bonds per molecule, such as divinylbenzene, ethyleneglycol di(meth)acrylate, diethyleneglycol di(meth) acrylate, triethyleneglycol di(meth)acrylate, tetraethyleneglycol di(meth)acrylate, 1,3-butyleneglycol di(meth)acrylate, 1,4-butanediol diacrylate, glycerin di(meth)acrylate, glycerin tri(meth)acrylate, trimethylolpropane di(meth)acrylate, trimethylolpropane tri(meth)acrylate, pentaerythritol di(meth) acrylate, pentaerythritol tri(meth)acrylate, pentaerythritol tetra(meth)acrylate, dipentaerythritol penta(meth)acrylate, neopentyl glycol diacrylate, 1,6-hexanediol diacrylate, glycerolallyloxy di(meth)acrylate, 1,1,1-tris(hydroxymethyl) ethane di(meth)acrylate and 1,1,1-tris(hydroxymethyl) ethane tri(meth)acrylate.

The acryl-modified cellulose ester derivative (D) may be produced by conducting radical polymerization reaction of the radical-polymerizable unsaturated monomer mixture (b) in the presence of the cellulose ester derivative (A) which may have the aforementioned radical-polymerizable unsaturated group, to obtain a reaction product, and then conducting radical polymerization reaction of the radical-polymerizable unsaturated monomer mixture (c) in the presence of this reaction product, or first conducting radical polymerization reaction of the radical-polymerizable unsaturated monomer mixture (c) to obtain a reaction product and then conducting radical polymerization reaction of the radical-polymerizable unsaturated monomer mixture (b) in the presence of this reaction product.

From the viewpoint of long-term storage stability of the dispersion of the invention, the content of each component, based on 100 parts by mass as the total of the cellulose ester derivative (A) optionally having at least one radical-polymerizable unsaturated group, the radical-polymerizable unsaturated monomer mixture (b) and the radical-polymerizable unsaturated monomer mixture (c), can generally be selected within the following ranges:

Cellulose ester derivative (A): 3.0-90 parts by mass
Radical-polymerizable unsaturated monomer mixture (b): 5.0-92 parts by mass
Radical-polymerizable unsaturated monomer mixture (c): 5.0-92 parts by mass,
and preferably within the following ranges:
Cellulose ester derivative (A): 5.0-80 parts by mass
Radical-polymerizable unsaturated monomer mixture (b): 10-85 parts by mass
Radical-polymerizable unsaturated monomer mixture (c): 10-85 parts by mass.

According to the invention, adding an epoxy group-containing polymerizable unsaturated monomer to the radical-polymerizable unsaturated monomer mixture (b) and/or the radical-polymerizable unsaturated monomer mixture (c), and especially to the radical-polymerizable unsaturated monomer (b), increases the grafting ratio of the hydrophobic acrylic resin (B) and hydrophilic acrylic resin (C), and this is therefore desirable to widen the range of initiators that can be used for production of the acryl-modified cellulose ester derivative (D).

The content of epoxy group-containing polymerizable unsaturated monomers added to the radical-polymerizable unsaturated monomer mixture (b) may be in the range of 0.01-10.00 mass % and especially 0.05-5.00 mass % in the radical-polymerizable unsaturated monomer mixture (b).

The acryl-modified cellulose ester derivative (D) is produced with the composition described above, and the acid value of the obtained acryl-modified cellulose ester derivative (D) is preferably in the range of 10-150 mgKOH/g, particularly 12-120 mgKOH/g and most particularly 15-90 mgKOH/g from the viewpoint of the long-term storage stability of the obtained dispersion.

Production of the acryl-modified cellulose ester derivative (D) involves separately conducting radical polymerization reaction of the radical-polymerizable unsaturated monomer mixture (b) to be used for synthesis of the hydrophobic acrylic resin (B) and the radical-polymerizable unsaturated monomer mixture (c) to be used for synthesis of the hydrophilic acrylic resin (C), in the presence of the cellulose ester derivative (A) optionally comprising at least one radical-polymerizable unsaturated group, but when no radical-polymerizable unsaturated group has been introduced into the cellulose ester derivative (A), the long-term storage stability of the obtained dispersion of the acryl-modified cellulose ester derivative (D) will be somewhat superior if the order of polymerization is first polymerization of the radical-polymerizable unsaturated monomer mixture (b) followed by polymerization of the radical-polymerizable unsaturated monomer mixture (c), rather than first polymerization of the radical-polymerizable unsaturated monomer mixture (c) followed by polymerization of the radical-polymerizable unsaturated monomer mixture (b). When at least one radical-polymerizable unsaturated group has been introduced into the cellulose ester derivative (A), on the other hand, the particle size of the obtained dispersion of the acryl-modified cellulose ester derivative (D) and its long-term storage stability will be superior with polymerization of the radical-polymerizable unsaturated monomer mixture (c) followed by polymerization of the radical-polymerizable unsaturated monomer mixture (b), rather than polymerization of the radical-polymerizable unsaturated monomer mixture (b) followed by polymerization of the radical-polymerizable unsaturated monomer mixture (c). Thus, the order of polymerization is preferably selected as appropriate for the case.

The reaction temperature for polymerization of the radical-polymerizable unsaturated monomer mixtures (b) and (c) will normally be in the range of about 60-200° C. and preferably about 70-160° C., and the reaction time will normally be up to about 10 hours and preferably 0.5-6 hours.

A polymerization initiator is preferably added as appropriate for this reaction. As examples of such polymerization initiators there may be mentioned inorganic peroxide-based compounds such as potassium or ammonium persulfate, hydrogen peroxide or percarbonic acid salts; organic peroxide-based compounds such as acyl peroxides (for example, benzoyl peroxide), alkylhydroperoxides (for example, t-butylhydroperoxide, p-menthanehydroperoxide), dialkyl peroxides (for example, di-t-butyl peroxide), alkyl peresters (for example, t-butyl peroxy-2-ethylhexanoate, t-butyl peroxyacetate, t-butyl peroxybenzoate and t-amyl peroxy-3,5,5-trimethylhexanoate), percarbonates (for example, di-isopropyl peroxydicarbonate and t-butyl peroxyisopropylcarbonate); and azo-based compounds such as azobisisobutyronitrile. Two or more of these polymerization catalysts may also be used in combination. There is no problem if the types and amounts of polymerization initiators differ for polymerization of the radical-polymerizable unsaturated monomer mixture (b) and polymerization of the radical-polymerizable unsaturated monomer mixture (c).

Of the polymerization initiators mentioned above, it is preferred to use organic peroxide-based compounds and especially benzoyl peroxide or t-butyl peroxy-2-ethylhexanoate, and when the cellulose ester derivative (A) does not contain a radical-polymerizable unsaturated group, it is preferable to use benzoyl peroxide because this will increase the grafting ratio of the hydrophobic acrylic resin (B) and hydrophilic acrylic resin (C) with respect to the cellulose ester derivative (A), resulting in satisfactory long-term storage stability of the obtained dispersion.

The polymerization initiator content is preferably in the range of 0.01-20 parts by mass, particularly 0.1-15 parts by mass and more particularly 0.3-10 parts by mass based on 100 parts by mass of the radical-polymerizable unsaturated monomer mixture, from the viewpoint of the stability of the obtained dispersion.

The polymerization for production of the acryl-modified cellulose ester derivative (D) is generally carried out in the presence of an organic solvent. The organic solvent, may be appropriately selected in consideration of the polymerization temperature, handleability during production of the dispersion and the long-term storage stability of the obtained dispersion.

An organic solvent may also be added when the acryl-modified cellulose ester derivative (D) is to be dispersed in water.

As organic solvents there are preferred alcohol-based solvents, cellosolve-based solvents, carbitol-based solvents and the like. As specific examples there may be mentioned alcohol-based solvents such as n-butanol; cellosolve-based solvents such as ethyleneglycol monobutyl ether, ethyleneglycol monoisopropyl ether, ethyleneglycol monomethyl ether, propyleneglycol monomethyl ether and propyleneglycol mono-n-butyl ether; and carbitol-based solvents such as diethyleneglycol monobutyl ether and diethyleneglycol monoethyl ether. Inert organic solvents that are immiscible with water may also be used, in ranges that do not impair the stability of the acryl-modified cellulose ester derivative (D) in the aqueous medium, and as examples of such organic solvents there may be mentioned aromatic hydrocarbon-based solvents such as toluene and xylene, esteric solvents such as ethyl acetate and butyl acetate, and ketone-based solvents such as methyl ethyl ketone and cyclohexanone. The amount of organic solvent in the dispersion of the invention is preferably no greater than 50 mass % of the aqueous medium, from the viewpoint of environmental protection.

Dispersion

A dispersion according to the invention can be obtained by dispersing the acryl-modified cellulose ester derivative (D) obtained as described above in an aqueous medium.

When the acryl-modified cellulose ester derivative (D) has anionic groups such as carboxyl groups, the acryl-modified cellulose ester derivative (D) can be dispersed in water by neutralizing some or all of the anionic groups in the acryl-modified cellulose ester derivative (D) with a basic compound, or the acryl-modified cellulose ester derivative (D) can be dispersed by adding the acryl-modified cellulose ester derivative (D) into an aqueous medium containing a basic compound.

As examples of basic compounds for neutralization there may be mentioned organic amines such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine and diethylenetriamine; or alkali metal hydroxides such as caustic soda and caustic potash, which may be suitably used at 0.1-1.1 equivalents and preferably 0.5-0.9 equivalents with respect to the carboxyl groups in the acryl-modified cellulose ester derivative (D).

According to the invention, the dispersion of the acryl-modified cellulose ester derivative (D) may have a mean particle size (Note 1) of 0.05-1.0 μm and preferably 0.08-0.8 μm. While a smaller mean particle size usually is associated with more satisfactory storage stability of a dispersion, if the mean particle size is too small, the viscosity of an aqueous coating composition comprising the dispersion will be increased, and therefore management to an appropriate size is important.

(Note 1) Mean particle size: The value obtained by diluting the sample with deionized water to a concentration appropriate for measurement, measuring at ordinary temperature (about 20° C.) with an N4 submicron particle analyzer (trade name of Beckman Coulter, Inc., particle size distribution analyzer), and analyzing by monodisperse mode (UNIMODAL) analysis.

Aqueous Coating Composition

The dispersion of the invention is formed into a film by application of the dispersion itself and then drying, and may therefore be used alone as a coating agent, but a coating film with excellent performance including curability, weather resistance and chemical resistance can be formed by combination with a curing agent having a group that reacts with the hydroxyl group of the acryl-modified cellulose ester derivative (D). The curing agent is preferably an amino resin and/or an optionally blocked polyisocyanate compound.

Melamine resins are common amino resins, and there may be mentioned methylolated melamine resins, or alkyl etherified melamine resins produced by full etherification or partial etherification of at least some of the methylol groups of a methylolated melamine resin with a C1-10 monohydric alcohol, while melamine resins having an imino group copresent in the molecule may also be used. The number-average molecular weights of such resins may be up to 3000 and especially no greater than 1500. While water-soluble or water-dispersible agents are most suitable, water-insoluble agents may also be used.

An optionally blocked polyisocyanate compound comprises both a polyisocyanate compound with a free isocyanate group and a blocked polyisocyanate compound with a blocked isocyanate group.

As examples of polyisocyanate compounds with free isocyanate group there may be mentioned organic polyisocyanates including aliphatic diisocyanates, such as hexamethylene diisocyanate and trimethylhexamethylene diisocyanate; cyclic aliphatic diisocyanates such as hydrogenated xylylene diisocyanate and isophorone diisocyanate; aromatic diisocyanates such as tolylene diisocyanate and 4,4'-diphenylmethane diisocyanate; and polyisocyanate compounds with 3 or more isocyanate groups such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate, or addition products of these organic polyisocyanates with polyhydric alcohols, low molecular weight polyester resins or water, and cyclized polymers formed from these organic polyisocyanates, as well as isocyanate/biurets. When a polyisocyanate compound with a free isocyanate group is used, it is preferably a two-pack coating composition used upon mixture with the acryl-modified cellulose ester derivative (D) dispersion just before coating, from the viewpoint of the storage and curability of the coating composition.

As polyisocyanate compounds with blocked isocyanate group there may be mentioned those obtained by blocking the isocyanate group of the aforementioned polyisocyanate compounds with free isocyanate group with known blocking agents such as oximes, phenols, alcohols, lactams, malonic acid diesters, acetoacetic acid esters or mercaptanes.

Water-dispersible polyisocyanate compounds are preferred, and as examples there may be mentioned polyisocyanates self-emulsified in water or forcibly dispersed with a stirrer or the like, or dispersed using anionic or nonionic surfactants. As examples of commercial products there may be mentioned AQUANATE 100, AQUANATE 110, AQUANATE 200 and AQUANATE 210 (all trade names of Nippon Polyurethane Industry Co., Ltd.); BAYHYDUR TPLS-2032, SUB-ISOCYANATE L801, BAYHYDUR VPLS-2319, BAYHYDUR 3100, VPLS-2336 and VPLS-2150/1 (all trade names of Sumika Bayer Urethane Co., Ltd.); TAKENATE WD-720, TAKENATE WD-725 and TAKENATE WD-220 (all trade names of Mitsui Chemical Polyurethane Co., Ltd.); and RESAMINE D-56 (trade name of Dainichiseika Color & Chemicals Mfg, Co., Ltd.), any of which may be used alone or in combinations of two or more.

When the acryl-modified cellulose ester derivative (D) is used as a base resin for an aqueous coating composition, the curing agent is usually added in a range of preferably about 10-50 mass % and especially 15-40 mass %, based on the total solid mass of the acryl-modified cellulose ester derivative (D).

The aqueous coating composition may be a clear coating or enamel coating, and if necessary it may be used in combination with different types of aqueous resins (acrylic resins, urethane resins, polyolefin resins, polyester resins and the like).

When the acryl-modified cellulose ester derivative (D) dispersion is to be used as a rheology controlling agents, such an effect can be obtained by using these aqueous resins as base resins and adding a small amount of the acryl-modified cellulose ester derivative (D) dispersion. Particularly in a metallic-based coating composition comprising an effect pigment such as an aluminum flake or mica pigment, this controls the orientation of the effect pigment and exhibits an effect of improving the flip-flop property or preventing metallic mottling. The amount of acryl-modified cellulose ester derivative (D) dispersion added for use as a rheology controlling agents is preferably 0.01-20 parts by mass and especially 0.1-10 parts by mass of the solid content with respect to 100 parts by mass of the total solid content of the base resin and curing agent.

The aqueous coating composition may also contain, if necessary, anti-settling agents, antifoaming agents, thickeners, rust-preventive agents, ultraviolet absorbers, surface control agents, pigment dispersants, pigments (for example, color pigments, such as titanium oxide, carbon black and red iron oxide; effect pigments, such as aluminum flake or mica, extender pigments such as clay, mica, baryta, calcium carbonate and silica; and rust-preventive pigments such as aluminum phosphomolybdate and aluminum tripolyphosphate) and the like, depending on the purpose.

The solid content of the aqueous coating composition may be adjusted by addition of deionized water and if necessary a hydrophilic organic solvent, to dilute the solid content of the coating composition to 5-70 mass % and preferably 20-60 mass %.

The aqueous coating composition may be applied to various types of base material surfaces, and as examples of such base materials there may be mentioned inorganic base materials, such as slate boards and PC boards; organic base materials such as plastics, and metals such as iron and aluminum. These surfaces to be coated may be coated with an aqueous or solvent-based primer composition, and if necessary coating of the primer composition may be followed by coating of the aqueous coating composition as an overcoat composition. Alternatively, coating of the aqueous coating composition of the invention as a primer composition may be followed by coating of a known aqueous overcoat composition.

As examples of methods for coating the aqueous coating composition, of the invention there may be mentioned air spray coating, airless spray coating, electrostatic coating, brush coating, roller coating, lithin gun coating, universal gun coating, dip coating, roll coating, curtain flow coating, roller curtain coating, die coating and the like, which may be appropriately selected according to the purpose of the base material. The coating amount may be, for example, in the range of 10-100 μm and preferably 15-80 μm. Several coatings may also be applied so long as the coating appearance is not impaired. Depending on the type of acryl-modified cellulose ester derivative (D) dispersion in the aqueous coating composition, the method of drying the coating film may be bake drying at 50-200° C. for 10-120 minutes and preferably 70-180° C. for 20-90 minutes, or forced drying at below 100° C. for 1-40 minutes followed by standing at ordinary temperature ($\leqq$50° C.) for at least 10 hours or ordinary temperature ($\leqq$50° C.) for 1-7 days, to volatilize off the water or organic solvent in the coating film and form the coating film as a continuous coating film.

EXAMPLES

The invention will now be explained in greater detail using examples and comparative examples, with the understanding that the invention is in no way limited in scope by the examples. The "parts" and "%" values are all based on mass.

Production of Dispersion of Acryl-Modified Cellulose Ester Derivative

Example 1

In a four-necked glass flask equipped with a thermometer, stirrer, reflux condenser, water separator and nitrogen inlet there was placed 50 parts of ethyleneglycol monobutyl ether, and the mixture was heated to 50° C. under a nitrogen stream while stirring. After a temperature of 50° C. was reached, 70.0 parts of CAB-551-0.01 (cellulose acetate butyrate by Eastman Chemical Products Company) was added, the mixture was heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise over a period of 1 hour while maintaining the same temperature, and upon completion of the dropwise addition the mixture was kept at a temperature of 120° C. for 1 hour.

Next, a mixture of 4.6 parts methyl methacrylate, 3.1 parts n-butyl acrylate, 2.3 parts 2-hydroxyethyl methacrylate and 0.50 part benzoyl peroxide was added dropwise into the flask over a period of 1 hour while maintaining the temperature of 120° C., and upon completion of the dropwise addition the mixture was kept at 120° C. for 1 hour to obtain a solution of acryl-modified cellulose ester derivative.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 1 of an acryl-modified cellulose ester derivative with a resin solid content of 30%, a resin acid value of 32 mgKOH/g and a mean particle size of 0.24 μm.

Examples 2 and 4-7

Dispersions of acryl-modified cellulose ester derivative were obtained in the same manner as Example 1, except that the starting materials and their amounts used in Example 1 were changed as shown in Table 1.

Example 3

In a four-necked glass flask equipped with a thermometer, stirrer, reflux condenser, water separator and nitrogen inlet there was placed 140 parts of toluene, and the mixture was heated to 50° C. under a nitrogen stream while stirring. After a temperature of 50° C. was reached, 70.0 parts of CAB-551-0.01 was added, the temperature was increased to nearly 110° C. while stirring, and then toluene was passed through a water separator for water separation for approximately 30 minutes under reflux. After water separation, 0.10 part of 2-isocyanatoethyl acrylate and a trace amount (approximately 0.0004 part) of dibutyltin dilaurate were added while maintaining a temperature of 105° C. for approximately 2 hours of reaction, to obtain a radical-polymerizable unsaturated group-containing cellulose ester derivative.

The radical-polymerizable unsaturated group content in the radical-polymerizable unsaturated group-containing cellulose ester derivative was 0.010 mmol/g.

After then adding 50 parts of ethyleneglycol monobutyl ether to the radical-polymerizable unsaturated group-containing cellulose ester derivative solution, the temperature was raised to 105° C., the toluene was recovered under reduced pressure, and the solvent in the system was exchanged from toluene to ethyleneglycol monobutyl ether.

The radical-polymerizable unsaturated group-containing cellulose ester derivative solution that had been solvent-exchanged with ethyleneglycol monobutyl ether was then heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part t-butylperoxy-2-ethyl hexanoate was added dropwise over a period of 1 hour while maintaining the same temperature, and upon completion of the dropwise addition the mixture was maintained at 120° C. for 1 hour.

Next, a mixture of 4.6 parts methyl methacrylate, 3.1 part n-butyl acrylate, 2.3 parts 2-hydroxyethyl methacrylate and 0.50 part t-butylperoxy-2-ethyl hexanoate was added dropwise into the flask over a period of 1 hour while maintaining the temperature of 120° C., and upon completion of the dropwise addition the mixture was maintained at 120° C. for 1 hour to obtain a solution of acryl-modified cellulose ester derivative.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 3 of an acryl-modified cellulose ester derivative with a resin solid content of 30%, a resin acid value of 32 mgKOH/g and a mean particle size of 0.15 μm.

Examples 8-11

Dispersions of acryl-modified cellulose ester derivative were obtained in the same manner as Example 3, except that the starting materials and their amounts used in Example 3 were changed as shown in Table 1. The radical-polymerizable unsaturated group content in the radical-polymerizable unsaturated group-containing cellulose ester derivative was 0.012 mmol/g.

Example 12

In a four-necked glass flask equipped with a thermometer, stirrer, reflux condenser, water separator and nitrogen inlet there was placed 50 parts of propyleneglycol mono-n-butyl ether, and the mixture was heated to 50° C. under a nitrogen stream while stirring. After a temperature of 50° C. was reached, 5.0 parts of CAB-551-0.01 was added, the mixture was heated to 120° C. and a mixture of 35.0 parts methyl methacrylate, 23.0 parts n-butyl acrylate, 17.0 parts 2-hydroxyethyl methacrylate and 3.75 parts benzoyl peroxide was added dropwise over a period of 2 hours while maintaining the same temperature, and upon completion of the dropwise addition the mixture was kept at 120° C. for 1 hour.

Next, a mixture of 9.2 parts methyl methacrylate, 2.2 parts n-butyl acrylate, 4.6 parts 2-hydroxyethyl methacrylate, 4.0 parts acrylic acid and 1.00 part benzoyl peroxide was added dropwise into the flask over a period of 1 hour while maintaining the temperature of 120° C., and upon completion of the dropwise addition the mixture was kept at 120° C. for 1 hour to obtain a solution of acryl-modified cellulose ester derivative.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 12 of an acryl-modified cellulose ester derivative with a resin solid content of 30%, a resin acid value of 32 mgKOH/g and a mean particle size of 0.20 µm.

Examples 13-15

Dispersions of acryl-modified cellulose ester derivative were obtained in the same manner as Example 12, except that the starting materials and their amounts used in Example 1 were changed as shown in Table 1.

Example 16

In a four-necked glass flask equipped with a thermometer, stirrer, reflux condenser, water separator and nitrogen inlet there was placed 160 parts of toluene, and the mixture was heated to 50° C. under a nitrogen stream while stirring. After a temperature of 50° C. was reached, 15.0 parts of CAB-551-0.01 was added and the mixture was heated to near 105° C. while stirring. Next, a mixture of 30.0 parts methyl methacrylate, 20.0 parts n-butyl acrylate, 15.0 parts 2-hydroxyethyl methacrylate and 3.25 parts t-butylperoxy2-ethyl hexanoate was added dropwise over a period of 2.0 hours while maintaining the same temperature, and upon completion of the dropwise addition the mixture was kept at 105° C. for 1.0 hour. The reaction product was then heated to near 110° C. while stirring, and toluene was passed through a water separator for water separation for approximately 30 minutes under reflux. After water separation, 0.10 part of 2-isocyanatoethyl acrylate and a trace amount (approximately 0.0004 part) of dibutyltin dilaurate were added while maintaining a temperature of 1.05° C. for approximately 2 hours of reaction, to obtain a radical-polymerizable unsaturated group-containing cellulose ester derivative.

After then adding 50 parts of ethyleneglycol monobutyl ether to the radical-polymerizable unsaturated group-containing cellulose ester derivative solution, the temperature was raised to 105° C., the toluene was recovered under reduced pressure, and the toluene in the system was replaced with ethyleneglycol monobutyl ether.

The radical-polymerizable unsaturated group-containing cellulose ester derivative solution that had been solvent-exchanged with ethyleneglycol monobutyl ether was then heated to 120° C., and then a mixture of 9.2 parts methyl methacrylate, 2.2 parts n-butyl acrylate, 4.6 parts 2-hydroxyethyl methacrylate, 4.0 parts acrylic acid and 1.00 part t-butylperoxy-2-ethyl hexanoate was added dropwise over a period of 1 hour while maintaining the same temperature, and upon completion of the dropwise addition the mixture was maintained at 120° C. for 1 hour to obtain an acryl-modified cellulose ester derivative solution.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 16 of an acryl-modified cellulose ester derivative with a resin solid content of 30%, a resin acid value of 32 mgKOH/g and a mean particle size of 0.17 µm.

Comparative Example 1

In a four-necked glass flask equipped with a thermometer, stirrer, reflux condenser, water separator and nitrogen inlet there was placed 50 parts of ethyleneglycol monobutyl ether, and the mixture was heated to 50° C. under a nitrogen stream while stirring. After a temperature of 50° C. was reached, 60.0 parts of CAB-551-0.01 (cellulose acetate butyrate by Eastman Chemical Products Company) was added, the mixture was heated to 120° C., and then a mixture of 20.0 parts methyl methacrylate, 6.0 parts n-butyl acrylate, 10.0 parts 2-hydroxyethyl methacrylate, 4.0 parts acrylic acid and 2.00 parts benzoyl peroxide was added dropwise over a period of 1 hour while maintaining the same temperature, and upon completion of the dropwise addition the mixture was kept at a temperature of 120° C. for 1 hour to obtain an acryl-modified cellulose ester derivative solution.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 17 of an acryl-modified cellulose ester derivative with a resin solid content of 30%, a resin acid value of 32 mgKOH/g and a mean particle size of 0.55 µm.

Comparative Example 2

In a four-necked glass flask equipped with a thermometer, stirrer, reflux condenser, water separator and nitrogen inlet there was placed 160 parts of toluene, and the mixture was heated to 50° C. under a nitrogen stream while stirring. After a temperature of 50° C. was reached, 80.0 parts of CAB-551-0.01 was added, the temperature was increased to near 110° C. while stirring, and then toluene was passed through a water separator for water separation for approximately 30 minutes under reflux. After water separation, 0.10 part of 2-isocyanatoethyl acrylate and a trace amount (approximately 0.0004 part) of dibutyltin dilaurate were added while maintaining a temperature of 105° C. for approximately 2 hours of reaction, to obtain a radical-polymerizable unsaturated group-containing cellulose ester derivative.

The radical-polymerizable unsaturated group content in the radical-polymerizable unsaturated group-containing cellulose ester derivative was 0.012 mmol/g.

After then adding 50.0 parts of ethyleneglycol monobutyl ether to the radical-polymerizable unsaturated group-containing cellulose ester derivative solution, the temperature was raised to 105° C., the toluene was recovered under reduced pressure, and the toluene in the system was replaced with ethyleneglycol monobutyl ether.

The radical-polymerizable unsaturated group-containing cellulose ester derivative solution that had been solvent-exchanged with ethyleneglycol monobutyl ether was then heated to 120° C., and a mixture of 9.2 parts methyl methacrylate, 2.2 parts n-butyl acrylate, 4.6 parts 2-hydroxyethyl methacrylate, 4.0 parts acrylic acid and 1.00 part t-butylperoxy-2-ethyl hexanoate was added dropwise over a period of 1 hour while maintaining the same temperature, and upon completion of the dropwise addition the mixture was kept at 120° C. for 1 hour to obtain an acryl-modified cellulose ester derivative solution.

The solution of the acryl-modified cellulose ester derivative was cooled to 60° C., and then 4.94 parts of dimethylethanolamine was added and the mixture was stirred for 15 minutes. Next, 178 parts of deionized water was added dropwise over a period of 1 hour while stirring, to obtain dispersion No. 18 of an acryl-modified cellulose ester derivative with a resin solid content of 30%, a resin acid value of 32 mgKOH/g and a mean particle size of 0.60 μm.

Comparative Example 3

After dissolving 40 parts of the carboxylated cellulose acetate butyrate CMCAB-641-0.2 (product of Eastman Chemical Products Company) in 100 parts of ethyleneglycol monobutyl ether, 3.86 parts of dimethylethanolamine was further added and the mixture was stirred for 15 minutes. Next, 60 parts of deionized water was added while stirring to adjust the resin solid content to 30%, but the mixture had extremely high viscosity and was difficult to handle. Upon further addition of deionized water the viscosity reached 2300 cps at a resin solid content of 15%, which made it handleable as a dispersion (No. 19).

Storage Stability Test

The dispersions obtained in the examples and comparative examples were subjected to storage stability testing by the following test method. The results are summarized in Table 1.

Storage stability: An 800 g portion of each dispersion was placed in an approximately 1 L-volume glass bottle and stored for 120 days in a thermostatic chamber at 40° C. It was then returned to room temperature and the condition in the container was visually observed and evaluated on the following scale.

Good (G): No deposition or notable viscosity changes observed.

Poor (P): Deposition and/or notable viscosity changes observed.

TABLE 1

| | | Example | | | | | | |
|---|---|---|---|---|---|---|---|---|
| | | 1 | 2 | 3 | 4 | 5 | 6 | 7 |
| Acryl-modified cellulose aqueous dispersion No. | | No. 1 | No. 2 | No. 3 | No. 4 | No. 5 | No. 6 | No. 7 |
| Toluene | | — | — | 140.0 | — | — | — | — |
| CAB-551-0.01 | | 70.0 | 70.0 | 70.0 | 80.0 | 30.0 | 80.0 | 30.0 |
| Solus2100 | | — | — | — | — | — | — | — |
| 2-Isocyanatoethyl acrylate | | — | — | 0.10 | — | — | — | — |
| Dibuyltin dilaurate | | — | — | trace | — | — | — | — |
| Ethyleneglycol monobutyl ether | | 50.0 | 50.0 | 50.0 | 50.0 | 50.0 | 50.0 | 50.0 |
| Acrylic section Stage 1 | Methyl methacrylate | 9.2 | 4.6 | 9.2 | 5.0 | 17.5 | 5.0 | 17.5 |
| | n-Butylacrylate | 2.2 | 3.1 | 2.2 | 2.5 | 8.8 | 2.1 | 8.8 |
| | 2-Hydroxyethyl methacrylate | 4.6 | 2.3 | 4.6 | 2.5 | 8.8 | 2.5 | 8.8 |
| | Acrylic acid | 4.0 | — | 4.0 | — | — | 0.4 | — |
| | Benzoyl peroxide | 1.00 | 0.50 | — | 0.50 | 1.75 | 0.50 | 1.75 |
| | t-Butylperoxy-2-ethylhexanoate | — | — | 1.00 | — | — | — | — |
| Acrylic section Stage 2 | Methyl methacrylate | 4.6 | 9.2 | 4.6 | 0.5 | 17.5 | 2.0 | 7.0 |
| | n-Butylacrylate | 3.1 | 2.2 | 3.1 | 0.5 | 6.0 | 2.5 | 8.8 |
| | 2-Hydroxyethyl methacrylate | 2.3 | 4.6 | 2.3 | 2.0 | 8.8 | 2.5 | 8.8 |
| | Acrylic acid | — | 4.0 | — | 7.0 | 2.8 | 3.0 | 10.5 |
| | Benzoyl peroxide | 0.50 | 1.00 | — | 0.50 | 1.75 | 0.50 | 1.75 |
| | t-Butylperoxy-2-ethylhexanoate | — | — | 0.50 | — | — | — | — |
| Neutralizer | Dimethylethanolamine | 4.94 | 4.94 | 4.94 | 5.19 | 3.12 | 3.78 | 5.19 |
| Dilution | Deionized water | 178 | 178 | 178 | 178 | 180 | 180 | 178 |
| Property values | Resin solid content (%) | 30 | 30 | 30 | 30 | 30 | 30 | 30 |
| | Resin acid value (mgKOH/g) | 32 | 32 | 32 | 55 | 22 | 27 | 82 |
| | Mean particle size (μm) | 0.24 | 0.22 | 0.30 | 0.19 | 0.23 | 0.25 | 0.16 |
| | Storage stability | G | G | G | G | G | G | G |

| | | Example | | | | | |
|---|---|---|---|---|---|---|---|
| | | 8 | 9 | 10 | 11 | 12 | 13 |
| Acryl-modified cellulose aqueous dispersion No. | | No. 8 | No. 9 | No. 10 | No. 11 | No. 12 | No. 13 |
| Toluene | | 120.0 | 120.0 | 120.0 | 120.0 | — | — |
| CAB-551-0.01 | | — | — | — | — | 5.0 | 10.0 |
| Solus2100 | | 60.0 | 60.0 | 60.0 | 60.0 | — | — |
| CMCAB-641-0.2 | | — | — | — | — | — | — |
| 2-Isocyanatoethyl acrylate | | 0.10 | 0.10 | 0.10 | 0.10 | — | — |
| Dibuyltin dilaurate | | trace | trace | trace | trace | — | — |
| Ethyleneglycol monobutyl ether | | 50.0 | 50.0 | 50.0 | 50.0 | — | — |
| Propyleneglycol mono n-butyl ether | | — | — | — | — | 50.0 | 50.0 |

TABLE 1-continued

| | | | | | | | |
|---|---|---|---|---|---|---|---|
| Acrylic section Stage 1 | Methyl methacrylate | 0.5 | 3.5 | 9.0 | 9.0 | 35.0 | 32.0 |
| | n-Butylacrylate | 0.5 | 3.0 | 9.0 | 9.0 | 23.0 | 22.0 |
| | 2-Hydroxyethyl methacrylate | 6.0 | 0.5 | 7.5 | 7.5 | 17.0 | 16.0 |
| | Acrylic acid | 3.0 | 3.0 | 4.5 | 4.5 | — | — |
| | Glycidyl methacrylate | — | — | — | — | — | — |
| | Benzoyl peroxide | — | — | — | — | 3.75 | 3.50 |
| | t-Butylperoxy-2-ethylhexanoate | 0.50 | 0.50 | 1.5 | 1.50 | — | — |
| Acrylic section Stage 2 | Methyl methacrylate | 15.0 | 15.0 | 2.0 | 5.0 | 9.2 | 9.2 |
| | n-Butylacrylate | 7.5 | 7.5 | 2.0 | 4.5 | 2.2 | 2.2 |
| | 2-Hydroxyethyl methacrylate | 7.5 | 7.5 | 6.0 | 0.50 | 4.6 | 4.6 |
| | Acrylic acid | 0 | 0 | 0 | 0 | 4 | 4 |
| | Benzoyl peroxide | — | — | — | — | 1.00 | 1.00 |
| | t-Butylperoxy-2-ethylhexanoate | 1.50 | 1.50 | 0.50 | 0.50 | — | — |
| Neutralizer | Dimethylethanolamine | 3.33 | 3.33 | 5.01 | 5.01 | 4.94 | 4.94 |
| Dilution (Deionized water) | | 180 | 180 | 178 | 178 | 178 | 178 |
| Property values | Resin solid content (%) | 30 | 30 | 30 | 30 | 30 | 30 |
| | Resin acid value (mgKOH/g) | 24 | 24 | 35 | 35 | 32 | 32 |
| | Mean particle size (μm) | 0.34 | 0.36 | 0.30 | 0.30 | 0.20 | 0.20 |
| | Storage stability | G | G | G | G | G | G |

| | | Example | | | Comp. Ex. | | |
|---|---|---|---|---|---|---|---|
| | | 14 | 15 | 16 | 1 | 2 | 3 |
| Acryl-modified cellulose aqueous dispersion No. | | No. 14 | No. 15 | No. 16 | No. 17 | No. 18 | No. 19 |
| Toluene | | — | — | 160.0 | — | 160.0 | — |
| CAB-551-0.01 | | 15.0 | 15.0 | 15.0 | 60.0 | 80.0 | — |
| Solus2100 | | — | — | — | — | — | — |
| CMCAB-641-0.2 | | — | — | — | — | — | 40.0 |
| 2-Isocyanatoethyl acrylate | | — | — | 0.10 | — | 0.10 | — |
| Dibuyltin dilaurate | | — | — | trace | — | trace | — |
| Ethyleneglycol monobutyl ether | | — | — | 50.0 | 50.0 | 50.0 | 100.0 |
| Propyleneglycol mono n-butyl ether | | 50.0 | 50.0 | — | — | — | — |
| Acrylic section Stage 1 | Methyl methacrylate | 30.0 | 29.5 | 30.0 | 20.0 | 9.2 | — |
| | n-Butylacrylate | 20.0 | 20.0 | 20.0 | 6.0 | 2.2 | — |
| | 2-Hydroxyethyl methacrylate | 15.0 | 15.0 | 15.0 | 10.0 | 4.6 | — |
| | Acrylic acid | — | — | — | 4.0 | 4.0 | — |
| | Glycidyl methacrylate | — | 0.5 | — | — | — | — |
| | Benzoyl peroxide | 3.25 | — | — | 2.00 | — | — |
| | t-Butylperoxy-2-ethylhexanoate | — | 3.25 | 3.25 | — | 1.00 | — |
| Acrylic section Stage 2 | Methyl methacrylate | 9.2 | 9.2 | 9.2 | — | — | — |
| | n-Butylacrylate | 2.2 | 2.2 | 2.2 | — | — | — |
| | 2-Hydroxyethyl methacrylate | 4.6 | 4.6 | 4.6 | — | — | — |
| | Acrylic acid | 4 | 4 | 4 | — | — | — |
| | Benzoyl peroxide | 1.00 | — | — | — | — | — |
| | t-Butylperoxy-2-ethylhexanoate | — | 1.00 | 1.00 | — | — | — |
| Neutralizer | Dimethylethanolamine | 4.94 | 4.94 | 4.94 | 4.94 | 4.94 | 3.86 |
| Dilution (Deionized water) | | 178 | 178 | 178 | 178 | 178 | 127 |
| Property values | Resin solid content (%) | 30 | 30 | 30 | 30 | 30 | 15 |
| | Resin acid value (mgKOH/g) | 32 | 30 | 32 | 32 | 32 | — |
| | Mean particle size (μm) | 0.20 | 0.18 | 0.17 | 0.55 | 0.60 | — |
| | Storage stability | G | G | G | P | P | P |

Production of Aqueous Coating Composition

Example 17

After placing 1073 parts (solid content: 322 parts) of acryl-modified cellulose ester derivative dispersion No. 1 obtained in Example 1, 120 parts of BAYHYDUR VPLS-2319 (product of Sumika Bayer Urethane Co., Ltd., hexamethylene diisocyanate-based water-dispersible polyisocyanate compound, solid content: 100%) and 280 parts of deionized water in a container, the components were mixed while stirring to obtain an aqueous coating composition with a solid content of 30%.

Examples 18-32 and Comparative Examples 4-6

Aqueous coating compositions were obtained in the same manner as Example 17, except for changing the composition of Example 17 as listed in Table 2 below.

Fabrication and Evaluation of Test Boards

Each aqueous coating composition obtained as described above was spray coated onto a polypropylene board to a dry film thickness of 50 μm. An electric hot air dryer was then used for drying at 80° C. for 30 minutes, and the test coated board obtained after standing for 1 day was used for the following test.

Finished Appearance

The surface condition of each test coated board was visually examined and evaluated as follows.

Good (G): Satisfactory smoothness without problems.
Fair (F): At least one problem noted from among swelling, dulling, creating problems.
Poor (P): At least one significant problem noted from among swelling, dulling, creating problems.

Non-Stickiness of Coating Film

The surface of each test coated board was pressed with a fingertip and the degree of sticking and fingerprint on the coating film were evaluated as follows.

Good (G) No sticking, no fingerprint.
Fair (F): Some sticking but no fingerprint.
Poor (P): Sticking and fingerprint.

Gel Fraction (%)

The coating film on the polypropylene board was released for use as a free film, and the film was placed in a separate-type round bottom flask and heated after addition of 100 g of acetone to 1 g of the film, for 3 hours of reflux. The film was then removed out and dried at 105° C. for 1 hour, and the film mass measured before and after reflux was applied for calculation by the following formula.

Gel fraction (%)=100×mass of film after reflux/mass of film before reflux.

TABLE 2

|  |  | Example |  |  |  |  |  |  |  |  |  |
|---|---|---|---|---|---|---|---|---|---|---|---|
|  |  | 17 | 18 | 19 | 20 | 21 | 22 | 23 | 24 | 25 | 26 |
| Acryl-modified cellulose derivative aqueous dispersion | No. 1 | 1073 |  |  |  |  |  |  |  |  |  |
|  | No. 2 |  | 1073 |  |  |  |  |  |  |  |  |
|  | No. 3 |  |  | 1073 |  |  |  |  |  |  |  |
|  | No. 4 |  |  |  | 1130 |  |  |  |  |  |  |
|  | No. 5 |  |  |  |  | 848 |  |  |  |  |  |
|  | No. 6 |  |  |  |  |  | 1097 |  |  |  |  |
|  | No. 7 |  |  |  |  |  |  | 848 |  |  |  |
|  | No. 8 |  |  |  |  |  |  |  | 929 |  |  |
|  | No. 9 |  |  |  |  |  |  |  |  | 1277 |  |
|  | No. 10 |  |  |  |  |  |  |  |  |  | 929 |
|  | No. 11 |  |  |  |  |  |  |  |  |  |  |
|  | No. 12 |  |  |  |  |  |  |  |  |  |  |
|  | No. 13 |  |  |  |  |  |  |  |  |  |  |
|  | No. 14 |  |  |  |  |  |  |  |  |  |  |
|  | No. 15 |  |  |  |  |  |  |  |  |  |  |
|  | No. 16 |  |  |  |  |  |  |  |  |  |  |
|  | No. 17 |  |  |  |  |  |  |  |  |  |  |
|  | No. 18 |  |  |  |  |  |  |  |  |  |  |
|  | No. 19 |  |  |  |  |  |  |  |  |  |  |
| BAYHYDUR VPLS-2319 |  | 120 | 120 | 120 | 120 | 120 | 120 | 120 | 120 | 120 | 120 |
| Deionized water |  | 280 | 280 | 280 | 280 | 280 | 280 | 280 | 280 | 280 | 280 |
| Finished apparance |  | G | G | G | G | G | G | G | G | G | G |
| Non-stickiness of coating |  | G | G | G | G | G | G | G | G | G | G |
| Gel fraction (%) |  | 81 | 81 | 83 | 82 | 85 | 82 | 85 | 85 | 80 | 85 |

|  |  | Example |  |  |  |  |  | Comp. Ex. |  |  |
|---|---|---|---|---|---|---|---|---|---|---|
|  |  | 27 | 28 | 29 | 30 | 31 | 32 | 4 | 5 | 6 |
| Acryl-modified cellulose derivative aqueous dispersion | No. 1 |  |  |  |  |  |  |  |  |  |
|  | No. 2 |  |  |  |  |  |  |  |  |  |
|  | No. 3 |  |  |  |  |  |  |  |  |  |
|  | No. 4 |  |  |  |  |  |  |  |  |  |
|  | No. 5 |  |  |  |  |  |  |  |  |  |
|  | No. 6 |  |  |  |  |  |  |  |  |  |
|  | No. 7 |  |  |  |  |  |  |  |  |  |
|  | No. 8 |  |  |  |  |  |  |  |  |  |
|  | No. 9 |  |  |  |  |  |  |  |  |  |
|  | No. 10 |  |  |  |  |  |  |  |  |  |
|  | No. 11 | 1277 |  |  |  |  |  |  |  |  |
|  | No. 12 |  | 989 |  |  |  |  |  |  |  |
|  | No. 13 |  |  | 1007 |  |  |  |  |  |  |
|  | No. 14 |  |  |  | 1027 |  |  |  |  |  |
|  | No. 15 |  |  |  |  | 1027 |  |  |  |  |
|  | No. 16 |  |  |  |  |  | 1027 |  |  |  |
|  | No. 17 |  |  |  |  |  |  | 984 |  |  |
|  | No. 18 |  |  |  |  |  |  |  | 1123 |  |
|  | No. 19 |  |  |  |  |  |  |  |  | 2147 |
| BAYHYDUR VPLS-2319 |  | 120 | 120 | 120 | 120 | 120 | 120 | 120 | 120 | 120 |
| Deionized water |  | 280 | 280 | 280 | 280 | 280 | 280 | 280 | 280 | 280 |
| Finished apparance |  | G | G | G | G | G | G | F | F | F |
| Non-stickiness of coating |  | G | G | G | G | G | G | G | G | G |
| Gel fraction (%) |  | 80 | 87 | 86 | 86 | 87 | 88 | 82 | 82 | 82 |

Use as Rheology Controlling Agents

Example 33

After combining 75 parts by solid content of a hydroxyl-containing acrylic resin (Note 1), 25 parts by solid content of "CYMEL 325" (product of Mitsui Cytech Co., Ltd., imino group-type melamine resin), 10 parts by solid content of "ALPASTE 7679NS" (trade name of Toyo Aluminium, KK., aluminum flake paste) and 1 part by solid content of acryl-modified cellulose ester derivative dispersion No. 1, in deionized water, the components were dispersed and adjusted to a viscosity of 13 seconds/Ford cup #4/20° C. to obtain metallic coating composition A. (Note 1): Hydroxyl-containing acrylic resin: A copolymer of monomer components comprising 38 parts methyl methacrylate, 17 parts ethyl acrylate, 10 parts n-butyl acrylate, 7 parts hydroxyethyl methacrylate, 20 parts lauryl methacrylate and 8 parts acrylic acid, neutralized with equivalent of diethanolamine. Number-average molecular weight: 30,000.

Comparative Example 7

After combining and dispersing 75 parts by solid content of a hydroxyl-containing acrylic resin (Note 1), 25 parts by solid content of "CYMEL 325" (product of Mitsui Cytech Co., Ltd., imino group-type melamine resin) and 10 parts by solid content of "ALPASTE 7679NS" (trade name of Toyo Aluminium, KK., aluminum flake paste) in deionized water, the dispersion was adjusted to a viscosity of 13 seconds/Ford cup #4/20° C. to obtain metallic coating composition B.

Coating Workability Test Results

The aqueous metallic coating compositions obtained in the examples and comparative examples were coated onto steel sheets, on which cationic electrodeposition coatings and intermediate coatings had been applied and cured, to a dry film thickness of 15 µm, and after preheating to 80° C. for about 5 minutes, an acrylic resin-based organic solvent-based overcoat clear coating composition (trade name: "MAGICRON KINO-1210", product of Kansai Paint Co., Ltd.) was applied onto the uncured coated side to a dry film thickness of 40 µm, and the coated sheet was allowed to stand for 7 minutes and then heated at 140° C. for 30 minutes for simultaneous curing of both coating films. The outer appearances of the obtained multilayer coating films were evaluated in the following manner, and the results are shown in Table 3.

Flip-flop property (FF value): The coated surface was visually examined at different angles and the change in metallic quality was observed and evaluated on the following scale.

Good (G): Major change in metallic quality, satisfactory flip-flop property.

Fair (F): Little change in metallic quality, somewhat inferior flip-flop property.

Poor (P): Virtually no change in metallic quality, significantly poor flip-flop property.

Metallic mottling: The uniform dispersibility of the metallic pigment in the multilayer coating film was visually examined and evaluated on the following scale.

Good (G): Absolutely no metallic mottling found.

Fair (F): Some metallic mottling found.

Poor (P): Numerous metallic mottling found.

TABLE 3

|  | Example 33 | Comparative Example 7 |
|---|---|---|
| Flip-flop property | G | F |
| Metallic mottling | G | F |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure[s] of all applications, patents and publications, cited herein and of corresponding Japanese application No. 2009-008620, filed Jan. 19, 2009 and Japanese application No. 2009-168413 filed Jul. 17, 2009 are incorporated by reference herein.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of producing a dispersion comprising an acryl-modified cellulose ester derivative (D) dispersed in an aqueous medium in which a hydrophobic acrylic resin (B) and a hydrophilic acrylic resin (C) are grafted onto a cellulose ester derivative (A) in the acryl-modified cellulose ester derivative (D), said method comprising:
    successively graft polymerizing a radical-polymerizable unsaturated monomer mixture (b) used to synthesize the hydrophobic acrylic resin (B) in the presence of the cellulose ester derivative (A), to form a reaction product and then graft polymerizing a radical-polymerizable unsaturated monomer mixture (c) used to synthesize the hydrophilic acrylic resin (C) in the presence of the reaction product,
    wherein the cellulose ester derivative (A) does not have radical-polymerizable unsaturated group,
    the amount of carboxyl group-containing radical-polymerizable unsaturated monomers in the radical-polymerizable unsaturated monomer mixture (b) is less than 5 mass %, and the amount of carboxyl group-containing radical-polymerizable unsaturated monomers in the radical-polymerizable unsaturated monomer mixture (c) is in the range of 5-95 mass %.

2. The method according to claim 1, wherein the radical-polymerizable unsaturated monomer mixture (b) and/or the radical-polymerizable unsaturated monomer mixture (c) comprise at least one epoxy group-containing polymerizable unsaturated monomer.

3. The method according to claim 1, wherein the cellulose ester derivative (A) is cellulose acetate butyrate and/or cellulose acetate propionate.

4. The method according to claim 1, wherein the acid value of the acryl-modified cellulose ester derivative (D) is in the range of 10-150 mgKOH/g.

5. The method according to claim 1, wherein the acryl-modified cellulose ester derivative (D) is synthesized with the following ranges:
- cellulose ester derivative (A): 3.0-90 parts by mass,
- radical-polymerizable unsaturated monomer mixture (b): 5.0-92 parts by mass,
- radical-polymerizable unsaturated monomer mixture (c): 5.0-92 parts by mass,
- based on 100 parts by mass as the total of the cellulose ester derivative (A), the radical-polymerizable unsaturated monomer mixture (b) and the radical-polymerizable unsaturated monomer mixture (c).

6. The method according to claim 1, wherein the radical polymerization initiator used for graft polymerization of the radical-polymerizable unsaturated monomer mixture (b) and/or radical-polymerizable unsaturated monomer mixture (c) onto the cellulose ester derivative (A) is an organic peroxide-based compound.

\* \* \* \* \*